United States Patent
Liang et al.

(10) Patent No.: US 12,324,076 B2
(45) Date of Patent: Jun. 3, 2025

(54) POWER AND SIGNAL TRANSMISSION METHOD FOR WIRELESS LAMP

(71) Applicant: Guangzhou Rising Dragon Recreation Industrial Co., Ltd., Guangzhou (CN)

(72) Inventors: Bo Liang, Guangzhou (CN); Ziqin Guo, Guangzhou (CN)

(73) Assignee: Guangzhou Rising Dragon Recreation Industrial Co., Ltd., Guangzhou (CN)

( * ) Notice: Subject to any disclaimer, the term of this patent is extended or adjusted under 35 U.S.C. 154(b) by 149 days.

(21) Appl. No.: 18/465,190

(22) Filed: Sep. 12, 2023

(65) Prior Publication Data

US 2024/0224404 A1 Jul. 4, 2024

(30) Foreign Application Priority Data

Dec. 30, 2022 (CN) .......................... 202211720408.7

(51) Int. Cl.
*H05B 45/30* (2020.01)
*H05B 45/20* (2020.01)
*H05B 45/325* (2020.01)
*H05B 45/37* (2020.01)
*H05B 47/16* (2020.01)
*H05B 47/165* (2020.01)
*H05B 47/195* (2020.01)

(52) U.S. Cl.
CPC .......... *H05B 47/195* (2020.01); *H05B 45/20* (2020.01); *H05B 45/325* (2020.01); *H05B 45/37* (2020.01); *H05B 47/16* (2020.01); *H05B 47/165* (2020.01)

(58) Field of Classification Search
CPC ........ H05B 45/10; H05B 45/20; H05B 45/30; H05B 45/325; H05B 45/37; H05B 47/10; H05B 47/16; H05B 47/165; H05B 47/195
See application file for complete search history.

(56) References Cited

U.S. PATENT DOCUMENTS 10,064,258 B2 * 8/2018 Lee ........................ H05B 41/39

* cited by examiner

*Primary Examiner* — Jimmy T Vu
(74) *Attorney, Agent, or Firm* — Andrew C. Cheng

(57) ABSTRACT

A power and signal transmission method for a wireless lamp including a lamp body and a lamp holder. The power and signal transmission method includes: S01: inputting a current to a power supply module of the lamp holder and inputting a control signal to the lamp holder and converting the control signal into a pulse control signal; S02: integrating each signal segment of the pulse control signal into a high-frequency signal with a preset frequency; S03: outputting carrier signal to the lamp body; S04: receiving the carrier signal, generating and outputting power to an LED drive module and a lamp body control module; S05: extracting the carrier signal, and outputting the carrier signal to the lamp body control module; S06: extracting the control signal from the pulse control signal; S07: correspondingly outputting a PWM signal to the LED drive module; and S08: driving the lamp to change light emitted therefrom.

7 Claims, 3 Drawing Sheets

POWER AND SIGNAL TRANSMISSION METHOD FOR WIRELESS LAMP

FIELD

The invention relates to wireless lamps, in particular to a power and signal transmission method for a wireless lamp.

BACKGROUND

To facilitate installation and fulfil a good waterproof effect, existing swimming pool lamps are supplied with power wirelessly. As shown in FIG. 4, a traditional swimming pool adopts a wireless emitter to supply power and a wireless receiving module disposed on the lamps. In a case where there are multiple swimming pool lamps in a same swimming pool, colours of these lamps should be changed synchronously. At present, a common method for keeping the swimming pool lamps changing synchronously is to detect and calculate a 50 HZ AC signal which is input through infrared transmission and then use the 50 HZ AC signal as a synchronous clock. However, this method has high requirements for the lamp as a receiver and the shell of an emitter, and the lamp of the receiver and the housing of the emitter must be transparent, which may otherwise compromise the infrared transmission effect. In addition, the use of an infrared receiving and transmitting module increases the risk of synchronization errors. Therefore, it is necessary to provide a novel wireless lamp and a power and signal transmission method for the wireless lamp.

SUMMARY

To solve the problems in the prior art, the invention provides a power and signal transmission method for a wireless lamp.

The present invention provides a power and signal transmission method for a wireless lamp which comprises a lamp body and a lamp holder. The lamp body comprises an LED lamp, an LED drive module, a lamp body control module, a wireless carrier signal extraction module and a wireless power receiving module, wherein the wireless power receiving module is electrically connected to the LED drive module, the lamp body control module and the wireless carrier signal extraction module, and the LED drive module is electrically connected to the LED lamp and drives the LED lamp to change light emitted therefrom; the lamp holder comprises a power supply module, and a lamp holder control module and a wireless power transmission module which are electrically connected to the power supply module, wherein the lamp holder control module is configured to receive a pulse control signal and send a carrier signal integrated with the pulse control signal to the wireless power transmission module. The power and signal transmission method for the wireless lamp comprises:

S01: inputting an AC/DC to the power supply module of the lamp holder and inputting an irregular control signal to the lamp holder control module by users, and converting, by the lamp holder control module, the irregular control signal into a pulse control signal;

S02: integrating, by the lamp holder control module, each signal segment of the pulse control signal into a high-frequency signal with a preset frequency, wherein every time the lamp holder control module detects a signal segment, which turns into a high level from a low level, of the pulse control signal, a low level with a preset duration is correspondingly output from the high-frequency signal to form a carrier signal;

S03: outputting, by the lamp holder control module, the carrier signal to the wireless power supply transmission module;

S04: receiving the carrier signal, generating power and outputting the power to the LED drive module and the lamp body control module, by the wireless power receiving module;

S05: extracting, by the wireless carrier signal extraction module, the carrier signal received by the wireless power receiving module, and rectifying and shaping the carrier signal into a pulse control signal, which is then output to the lamp body control module;

S06: extracting, by the lamp body control module, the control signal from the pulse control signal, wherein the control signal is used for changing light;

S07: correspondingly outputting, by the lamp body control module, a PWM signal to the LED drive module according to the extracted control signal; and S08: driving, by the LED drive module, the LED lamp to change light emitted therefrom according to the PWM control signal.

Preferably, the lamp holder further comprises a signal processing module configured to receive the control signal, process the control signal into the pulse control signal, and output the pulse control signal to the lamp holder control module.

Preferably, the frequency of the high-frequency signal is 50 KHZ-200 KHZ.

Preferably, the duration of the low level of the carrier signal is 50-300 µs.

Preferably, the when the control signal is a 50 HZ AC signal, the signal processing module filters and rectifies the 50 HZ AC signal into a 100 HZ pulse control signal.

Preferably, S6 specifically comprises: calculating the number of pulses in the pulse control signal, and with the number of the pulses in the pulse control signal as a clock reference of a lighting effect, changing the colour of light every time the number of the pulses reaches a preset value.

Preferably, S6 specifically comprises: extracting light control data in the pulse control signal, for example, a high level with a first preset duration represents 0, and a high level with a second preset duration represents 1.

The power and signal transmission method for a wireless lamp provided by the invention has the following beneficial effects:

The power and signal transmission method for the wireless lamp omits an infrared signal transmission module in a wireless emitter in the prior art, the control signal is transmitted in the form of a high or low level of a shaped pulse signal detected by an MCU rather than in the form of an infrared signal, and on/off of the pulse control signal is controlled, such that a synchronous AC signal required by the lamp is integrated into a carrier to generate a carrier modulation signal, which is then transmitted by the wireless power transmission module; and the wireless carrier signal extraction module is disposed in the wireless lamp to replace an original infrared receiving module, and the wireless carrier signal extraction module can separate the AC signal from the modulation signal to obtain a complete pulse signal, which is then provided to and processed by the control module of the lamp. Compared with infrared transmission, the power and signal transmission method provided by the invention does not increase the electronic hardware cost and only uses an existing wireless transmission circuit; the lamp and the emitter are flexible in structural design and can be made of non-transparent and non-metallic materials; and the production process of infrared parts can be simplified, the cost is reduced, and light synchronization errors are avoided.

DESCRIPTION OF THE EMBODIMENTS

Hereinafter, a power and signal transmission method for a wireless lamp provided by the invention will be further described in conjunction with the accompanying drawings. It should be pointed out that the technical solution and design principle of the invention are expounded below merely with reference to an optimal technical solution.

In the full description of the invention, it should be noted that the nouns of locality such as terms "centre", "crosswise", "lengthwise", "lateral", "length", "width", "thickness", "upper", "lower", "front", "back", "left", "right", "vertical", "perpendicular", "horizontal", "top", "bottom", "inner", "outer", "clockwise" and "anticlockwise" are used to indicate directional or positional relationships based on the accompanying drawings or directional or positional relationships commonly understood by those skilled in the art merely for the purpose of facilitating and simplifying the description, do not indicate or imply that devices or elements referred to must be in a direction, or be constructed and operated in a specific direction, and thus, should not be construed as limiting the specific protection scope of the invention.

Figure 1:
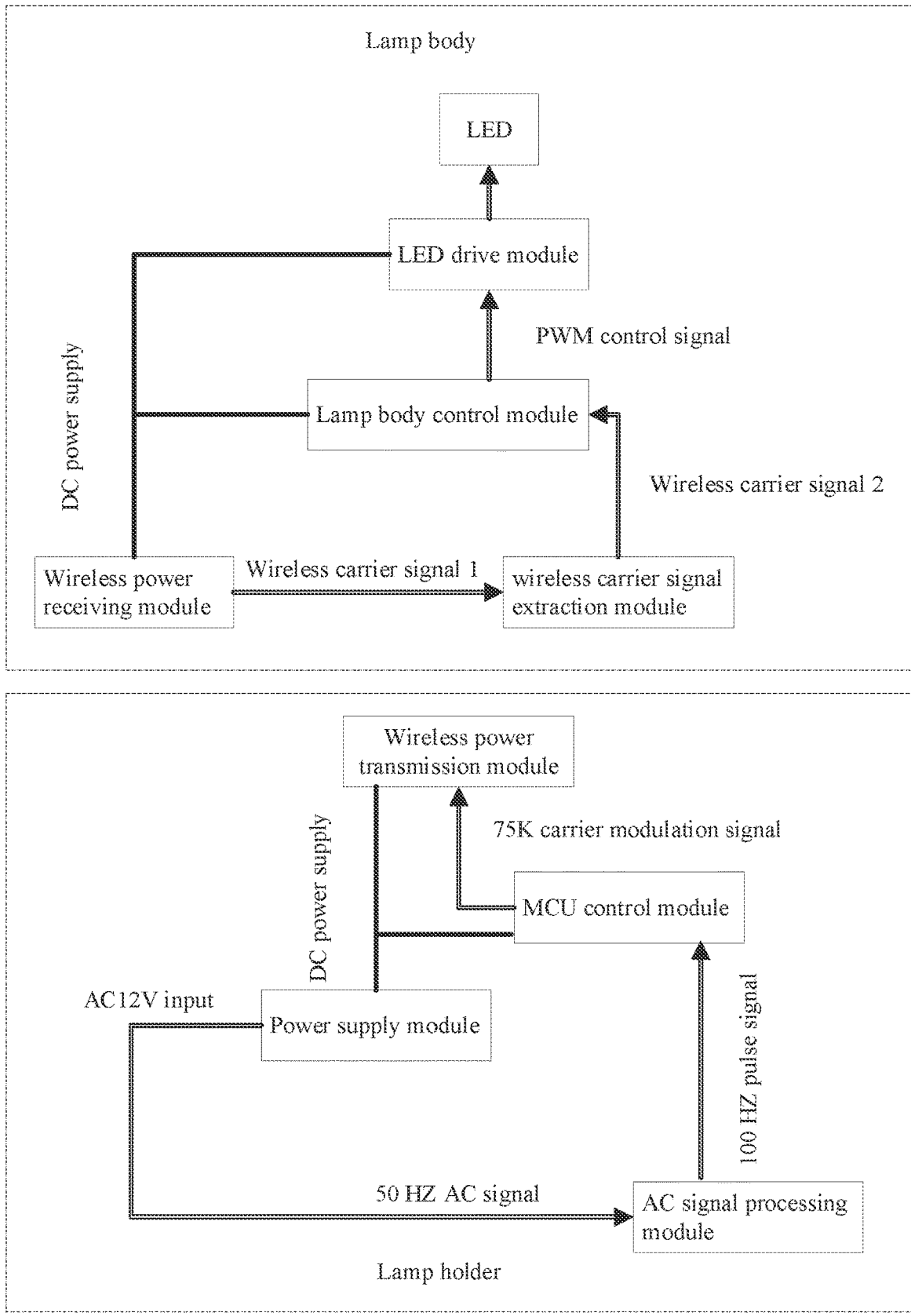
FIG. 1 is a structural diagram of a wireless lamp according to a first embodiment of the invention.

First, referring to FIG. 1, a first embodiment of the invention provides a power and signal transmission method for a wireless lamp. The wireless lamp comprises a lamp body and a lamp holder, wherein the lamp body comprises an LED lamp, an LED drive module, a lamp body control module, a wireless carrier signal extraction module and a wireless power receiving module. The wireless power receiving module is electrically connected to the LED drive module, the lamp body control module and the wireless carrier signal extraction module, and the LED drive module is electrically connected to the LED lamps for driving the LED lamps to change light emitted therefrom. The lamp holder comprises a power supply module, and a lamp holder control module (MCU control module in FIG. 1) and a wireless power transmission module which are electrically connected to the power supply module, wherein the lamp holder control module is configured to receive a pulse control signal and send a carrier signal integrated with the pulse control signal to the wireless power transmission module. In this embodiment, the lamp holder further comprises an AC signal processing module, which is configured to receive a control signal, process the control signal into the pulse control signal and output the pulse control signal to the lamp holder control module. Whether the AC signal processing module is needed depends on the control signal transmitted from users. If the control signal transmitted from the users is a pulse control signal, the AC signal processing module may be omitted. An original control signal used in this embodiment is a 50 HZ AC signal, so the AC signal processing module is needed.

The power and signal transmission method for the wireless lamp comprises the following steps:

S01: inputting an AC/DC to the power supply module of the lamp holder and inputting an irregular control signal to the lamp holder control module by users, and converting, by the lamp holder control module, the irregular control signal into a pulse control signal;

S02: integrating, by the lamp holder control module, each signal segment of the pulse control signal into a high-frequency signal with a preset frequency, wherein every time the lamp holder control module detects a signal segment, which turns into a high level from a low level, of the pulse control signal, a low level with a preset duration is correspondingly output from the high-frequency signal to form a carrier signal, the frequency of the high-frequency signal is 50 KHZ-200 KHZ, and the duration of the low level of the carrier signal is 50-150 μs;

S03: outputting, by the lamp holder control module, the carrier signal to the wireless power supply transmission module;

S04: receiving the carrier signal, generating power, and outputting the power to the LED drive module and the lamp body control module, by the wireless power receiving module;

S05: extracting, by the wireless carrier signal extraction module, the carrier signal received by the wireless power receiving module, and rectifying and shaping the carrier signal into a pulse control signal which is then output to the lamp body control module;

S06: extracting, by the lamp body control module, the control signal from the pulse control signal, wherein the control signal is used for changing light;

S07: correspondingly outputting, by the lamp body control module, a PWM signal to the LED drive module according to the extracted control signal; and S08: driving, by the LED drive module, the LED lamp to change light emitted therefrom according to the PWM control signal.

Figure 2:
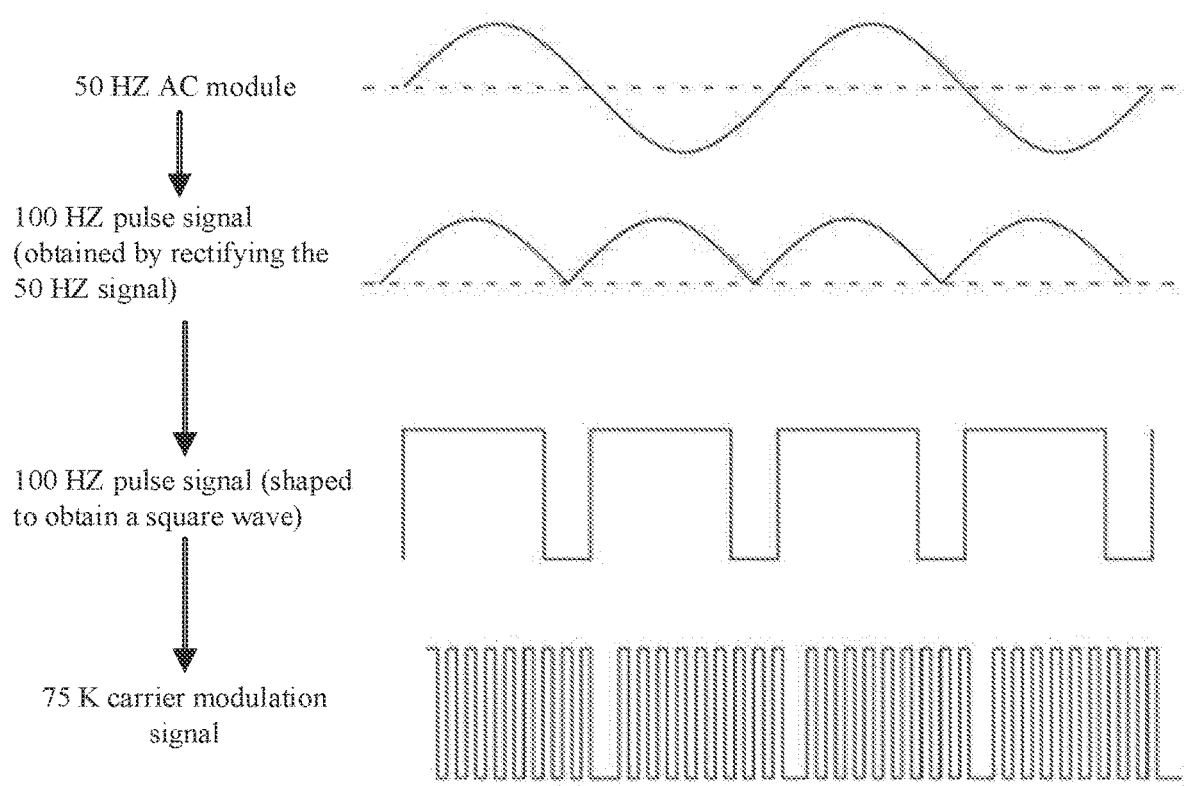
FIG. 2 illustrates the signal change process in a lamp holder according to the first embodiment of the invention.

The signal processing method will be further described in conjunction with FIG. 2. First, a 50 HZ AC signal is rectified by the AC signal processing module to obtain a 100 HZ pulse signal, then the 100 HZ pulse signal is shaped to obtain a square wave, then the MCU control module detects whether the shaped 100 HZ pulse signal is a high level or low level and controls on-off of a 75 K pulse signal, and in this way, the synchronous AC signal required by the lamp is integrated into a 75 K carrier wave to generate a 75 K carrier wave modulation signal, which is then transmitted by the wireless power transmission module. The specific detection process is as follows: when the MCU control module detects that the 100 HZ pulse signal turns into a high level from a low level, the 75 K signal will be cut off for 50-150 μs, and then resume, such that the power-off duration is minimized under the precondition of reserving information of the pulse signal.

Figure 3:
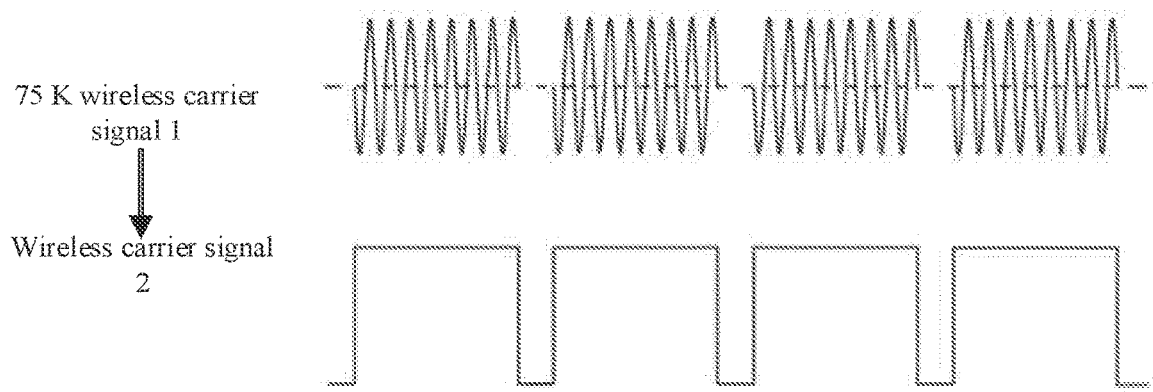
FIG. 3 illustrates the signal change process in a lamp body according to the first embodiment of the invention.
Figure 4:
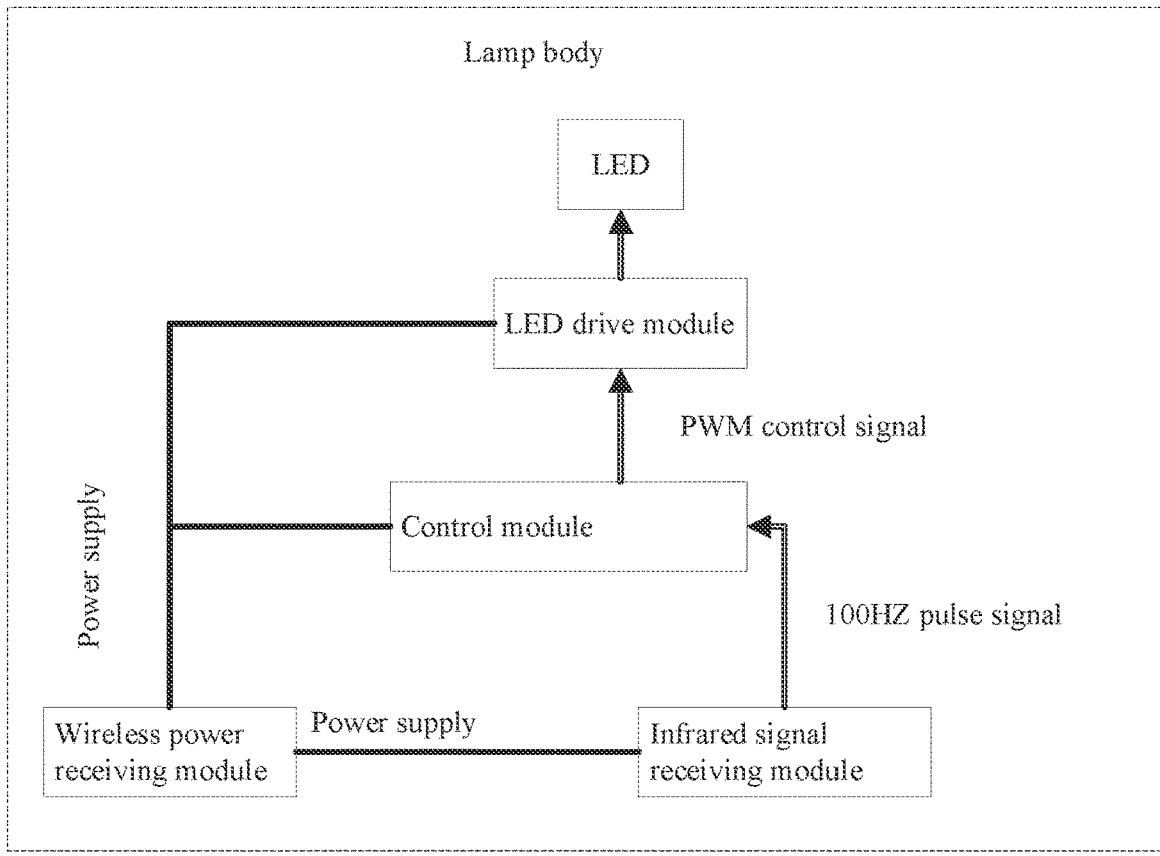
FIG. 4 is a structural diagram of a traditional wireless lamp.
Figure 4:
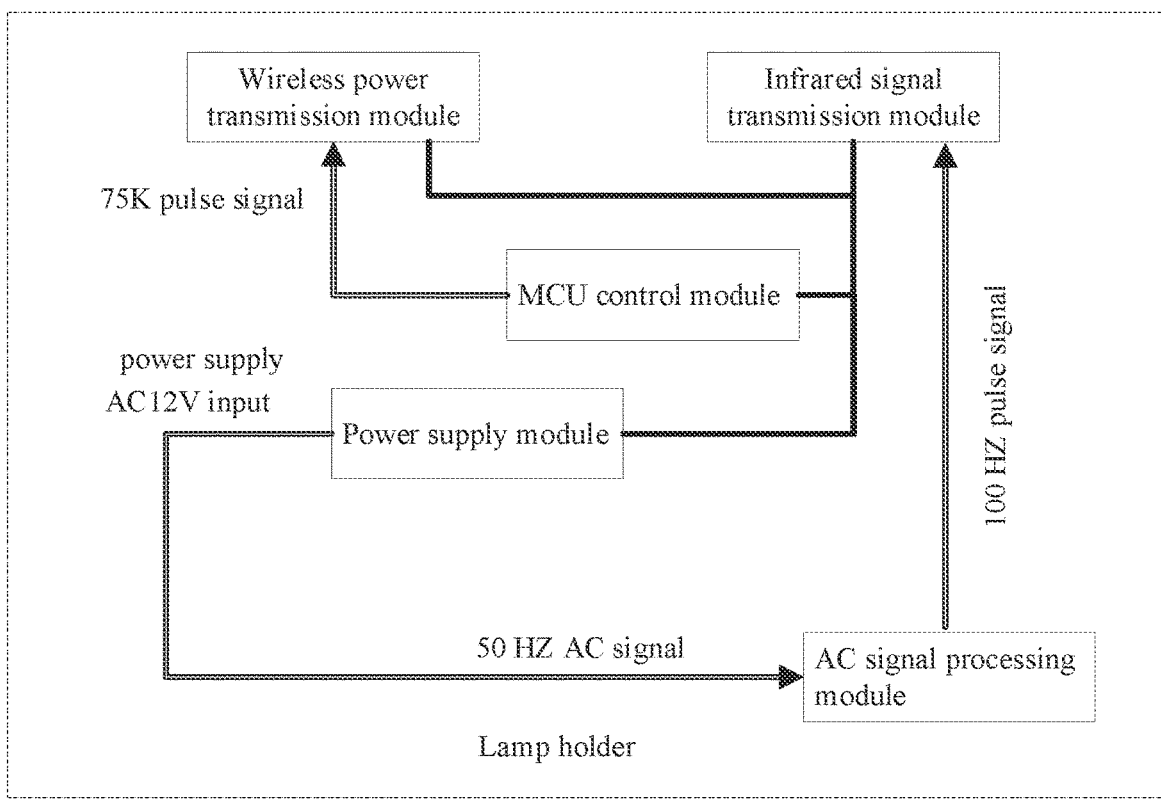

In conjunction with FIG. 3, the wireless carrier signal extraction module separates a AC signal from a 75 K wireless carrier signal 1 to obtain a complete 100 HZ wireless carrier signal 2, which is then provided to and processed by the control module of the lamp.

In S6, the extracted pulse signal may be used in the following two ways:

First, the extracted signal may be used as a colour changing instruction of the lamp. Specifically, the number of pulses in the pulse control signal is calculated, and with the number of pulses in the pulse control signal as a clock reference of the lighting effect, i.e., the colour of light is changed every time the number of the pulses in the pulse control signal reaches a preset value.

Second, the extracted signal may be used for data packet transmission of the lamp. Specifically, light control data in the pulse control signal is extracted. For example, a high level with a first preset duration represents 0, and a high level with a second preset duration represents 1; and after all levels are extracted, a control data packet formed by a plurality of groups of "0" and "1" is obtained. Specific combinations and control will not be detailed here.

The power and signal transmission method for the wireless lamp omits an infrared signal transmission module in a wireless emitter in the prior art, the control signal is transmitted in the form of a high or low level of a shaped pulse signal detected by an MCU rather than in the form of an infrared signal, and on/off of the pulse control signal is controlled, such that a synchronous AC signal required by the lamp is integrated into a carrier wave to generate a carrier modulation signal, which is then transmitted by the wireless power transmission module. For a wireless lamp, a wireless carrier signal extraction module can be used to replace an original infrared receiving module in the wireless lamp, and the wireless carrier signal extraction module can separate the AC signal from the modulation signal to obtain a complete pulse signal, which is then provided to and processed by the control module of the lamp. Compared with the wireless lamp using infrared transmission, the power and signal transmission method provided by the invention does not increase the electronic hardware cost and only uses an existing wireless transmission circuit; the lamp and the emitter are flexible in structural design and can be made of non-transparent and non-metallic materials; and the production process of infrared parts can be omitted, the cost is reduced, and light synchronization errors are avoided.

The above embodiments are merely preferred ones of the invention. It should be pointed out that these preferred embodiments should not be construed as limitations of the invention. The protection scope of the invention should be defined by the claims. Those ordinarily skilled in the art can make some improvements and modifications without deviating from the spirit and scope of the invention, and all these improvements and modifications should also fall within the protection scope of the invention.

What is claimed is:

1. A power and signal transmission method for a wireless lamp which comprises a lamp body and a lamp holder, wherein
    the lamp body comprises an LED lamp, an LED drive module, a lamp body control module, a wireless carrier signal extraction module and a wireless power receiving module, the wireless power receiving module being electrically connected to the LED drive module, the lamp body control module and the wireless carrier signal extraction module, the LED drive module being electrically connected to the LED lamp for driving the LED lamp to change light emitted therefrom; and
    the lamp holder comprises a power supply module, and a lamp holder control module and a wireless power transmission module which are electrically connected to the power supply module, the lamp holder control module being configured to receive a pulse control signal and send a carrier signal integrated with the pulse control signal to the wireless power transmission module;

the power and signal transmission method comprising:
    S01: inputting an AC/DC to the power supply module of the lamp holder and inputting an irregular control signal to the lamp holder control module, and converting, by the lamp holder control module, the irregular control signal into a pulse control signal;
    S02: integrating, by the lamp holder control module, each signal segment of the pulse control signal into a high-frequency signal with a preset frequency, wherein every time the lamp holder control module detects a signal segment, which turns into a high level from a low level, of the pulse control signal, a low level with a preset duration is correspondingly output from the high-frequency signal to form a carrier signal;
    S03: outputting, by the lamp holder control module, the carrier signal to the wireless power supply transmission module;
    S04: receiving the carrier signal, generating power and outputting the power to the LED drive module and the lamp body control module, by the wireless power receiving module;
    S05: extracting, by the wireless carrier signal extraction module, the carrier signal received by the wireless power receiving module, and rectifying and shaping the carrier signal into a pulse control signal, which is then output to the lamp body control module;
    S06: extracting, by the lamp body control module, the control signal from the pulse control signal, wherein the control signal is configured for changing light;
    S07: correspondingly outputting, by the lamp body control module, a PWM signal to the LED drive module according to the extracted control signal; and
    S08: driving, by the LED drive module, the LED lamp to change light emitted therefrom according to the PWM control signal.

2. The power and signal transmission method for a wireless lamp according to claim 1, wherein the lamp holder further comprises a signal processing module configured to receive the control signal, process the control signal into the pulse control signal, and output the pulse control signal to the lamp holder control module.

3. The power and signal transmission method for a wireless lamp according to claim 1, wherein the frequency of the high-frequency signal is in a range of 50 KHZ-200 KHZ.

4. The power and signal transmission method for a wireless lamp according to claim 3, wherein the duration of the low level of the carrier signal is 50-300 μs.

5. The power and signal transmission method for a wireless lamp according to claim 3, wherein when the control signal is a 50 HZ AC signal, the signal processing module filters and rectifies the 50 HZ AC signal into a 100 HZ pulse control signal.

6. The power and signal transmission method for a wireless lamp according to claim 1, wherein S6 specifically comprises: calculating the number of pulses in the pulse control signal, and with the number of the pulses in the pulse control signal as a clock reference of a lighting effect, changing the colour of light every time the number of the pulses reaches a preset value.

7. The power and signal transmission method for a wireless lamp according to claim 1, wherein S6 specifically comprises: extracting light control data in the pulse control signal, wherein a high level with a first preset duration represents 0, and a high level with a second preset duration represents 1.

* * * * *